INVENTOR.
Alfred D. Slatkin
BY
Hauke + Hauke
ATTORNEYS

May 24, 1966 A. D. SLATKIN 3,253,201

ELECTROSTATIC PROCESSING SYSTEM

Filed Sept. 12, 1961 10 Sheets-Sheet 2

INVENTOR.
Alfred D. Slatkin
BY Hauke & Hauke
ATTORNEYS

May 24, 1966 A. D. SLATKIN 3,253,201

ELECTROSTATIC PROCESSING SYSTEM

Filed Sept. 12, 1961 10 Sheets-Sheet 3

INVENTOR.
Alfred D. Slatkin

BY Hauke & Hauke

ATTORNEYS

INVENTOR.
Alfred D. Slatkin
BY Hauke & Hauke
ATTORNEYS

INVENTOR.
Alfred D. Slatkin
BY
Hauke & Hauke
ATTORNEYS

INVENTOR.
Alfred D. Slatkin
BY
Hauke & Hauke
ATTORNEYS

May 24, 1966 A. D. SLATKIN 3,253,201

ELECTROSTATIC PROCESSING SYSTEM

Filed Sept. 12, 1961 10 Sheets-Sheet 7

INVENTOR.
Alfred D. Slatkin
BY
Hauke + Hauke
ATTORNEYS

INVENTOR.
Alfred D. Slatkin
BY Hauke + Hauka
ATTORNEYS

INVENTOR.
Alfred D. Slatkin
BY Hauke & Hauke
ATTORNEYS

ELECTROSTATIC PROCESSING SYSTEM

Filed Sept. 12, 1961 10 Sheets-Sheet 10

INVENTOR.
Alfred D. Slatkin
BY
Hauke & Hauke
ATTORNEYS

United States Patent Office 3,253,201

Patented May 24, 1966

3,253,201

ELECTROSTATIC PROCESSING SYSTEM

Alfred D. Slatkin, Bloomfield, Mich., assignor to Hi-En-Co., Inc., Detroit, Mich., a corporation of Michigan Filed Sept. 12, 1961, Ser. No. 137,660
34 Claims. (Cl. 317—262)

My invention relates to electrostatic processing systems and more particularly to a highly improved system for generation of a high intensity electrostatic field fully controlled with respect to the net charge absorption efficiency or ionization potential of the material to be processed and to variable processing conditions.

The general field of electrostatic phenomenon has recently received greater attention outside of experimental research. However, the use of electrostatic power in industrial processes has met with rather sporadic success, primarily because electrostatic phenomena are not well understood or are actually misunderstood, and because in many applications the forces involved have been considered too difficult to control.

One area in which, despite difficulties, electrostatic power has been used to some extent, is the manufacture of abrasive products such as sandpaper and the like. This is because the deposition of abrasive particles electrostatically produces grain orientation in which the sharpest points are directed outwardly from the material on which they are deposited. This results in much higher quality abrasives than can be achieved by conventional gravity-fed systems of manufacture.

However, heretofore even such use has many limitations. For example, although small grid grain can be fairly readily deposited, very often the grain orientation is unsatisfactory. It has become clear to me that the reason lies in the fact that, simply because small grain is readily moved electrostatically, it moves too fast, and since heretofore the distance of travel, i.e. the space traversed by the electrostatic flux field, has been dimensionally small, namely about two centimeters, the individual grains have too little opportunity to turn over and deposit sharp side outward.

Another limitation is in the fact that heretofore larger size grains could not be moved in the quantities required for high capacity production of full coat deposit, because of a lack of electron flux density, which is insufficient to ionize the mass of material required. With a grain size of 50 grid and coarser, these problems have heretofore been practically unsolvable, as can be established by referring to what is made by the abrasive coating manufacturers other than those using the present equipment.

Other difficulties have also been encountered. The occurrence of arcing results in costly damage. Inconsistency of product weight occurs through unforeseen variations in field strengths, and at the speed of production used many yards of material are too often scrapped. Also, unpredictable surges of power due to such arcing may actuate the required automatic cut-out devices, causing costly shutdowns of equipment.

Considerable study in the electrostatic processing field has led me to the solution of numerous problems and the consequent development of practical systems and equipment adaptable to production installations. Many of the concepts discussed herein will have application to various electrostatic processes, but for convenience the present discussion will be related to the full scale continuous manufacture of abrasive coated cloth, paper and the like, all of which will herein be called sandpaper.

An object of my invention is to improve electrostatic processes by providing a fully controllable charge generating system.

Another object of my invention is to provide an improved electrostatic processing system by utilizing efficient anti-corona structure in critical areas.

A further object of my invention is to increase the useful density of an electrostatic field by providing energy channeling elements of improved construction.

Yet another object of my invention is to facilitate quality control of products manufactured in electrostatic systems by providing variably adjustable and controllable structure.

Still a further object of the invention is to provide an improved electrostatic processing system by constructing a new and more effective electron accumulator.

A still further object of the invention is to improve products made using electrostatic processes by reducing undesirable leakages of energy.

Other objects and advantages in the present invention will be made apparent in the following description and reference may be had to the accompanying drawings in which like reference characters refer to like parts throughout the several views and in which.

Figure 1:
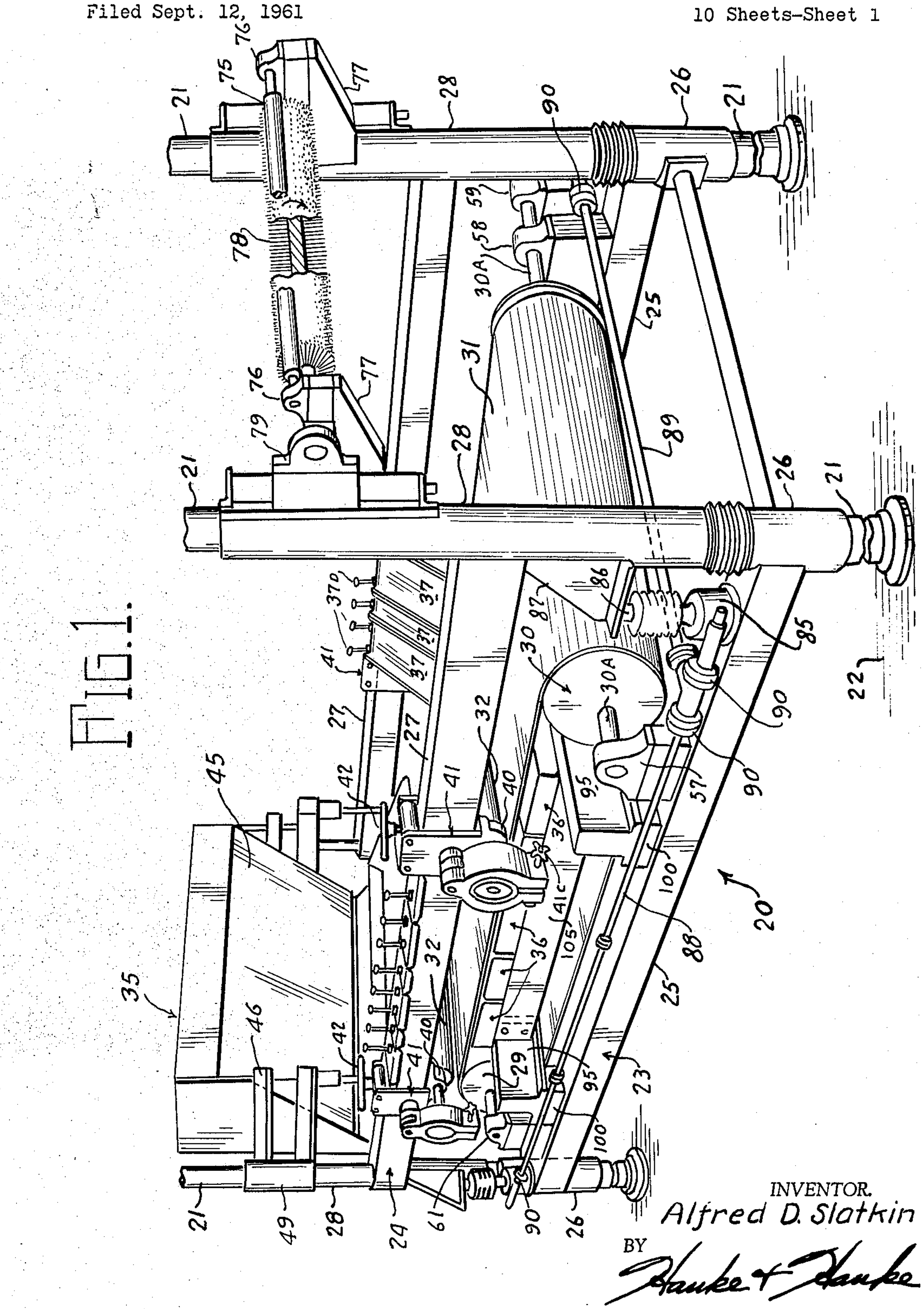
FIG. 1 is a perspective view of a preferred electrostatic grain applicator machine constructed in accordance with the present invention.

It will be noted that in the present application the approach in conceiving of the total process requires that some terminology be specially defined.

For example, the heart of an electrostatic processing system can be considered as analogous to a capacitor in which there is power leakage across the insulating medium. Thus, the "capacitor" in the present system 'ncludes what I term herein an "electron accumulator" as the distributing media of controlled and stored electrons delivered by a D.C. power source of approximately ¾ kilowatt controlled with a conventional variac and instrumented with a conventional kilo-voltmeter and milliammeter, including proper safety devices. The air gap between the electron accumulator and the ground plate, in cooperation with the special insulating or dielectric material of the accumulator, produces the desired electron flux density. Also, the use of the term "anti-corona design" describes the functional design of elements that reduces or prevents leakage of power to the surrounding air, such leakage being recognized by ionization of the air, including the characteristics production of ozone and the sometimes observable corona or glow surrounding the leaking parts due to high voltage.

It will also be recognized that the use of the term "voltage" refers not merely to an electric potential but also to the speed or energy of electrons themselves which flow from the accumulator to the ground plate, and the flux field is expressed as the density produced, i.e., the number of electrons per cubic centimeter in the electrostatic field.

Referring now to the drawings, and particularly FIGS. 1, 2, 5, 6 and 7, a preferred electrostatic processing machine 20 for the manufacture of sandpaper comprises four vertical support posts 21 supported on a floor 22 and carrying frame structures 23 and 24. Frame structure 23 comprises a pair of spaced longitudinal members 25 having end sleeves 26 secured thereto and mounted on the posts 21 as shown, preferably such that the members 25 are accurately located and maintained horizontal at all times, although in some cases a lengthwise slope may be used to improve the tracking capabilities of the paper or cloth.

The frame structure 24 comprises a pair of spaced longitudinal members 27 having end sleeves 28 secured thereto and vertically slidable on the posts 21, the members 27 being preferably accurately maintained at all times in a common horizontal plane disposed parallel to the plane of the members 25.

Figure 2:
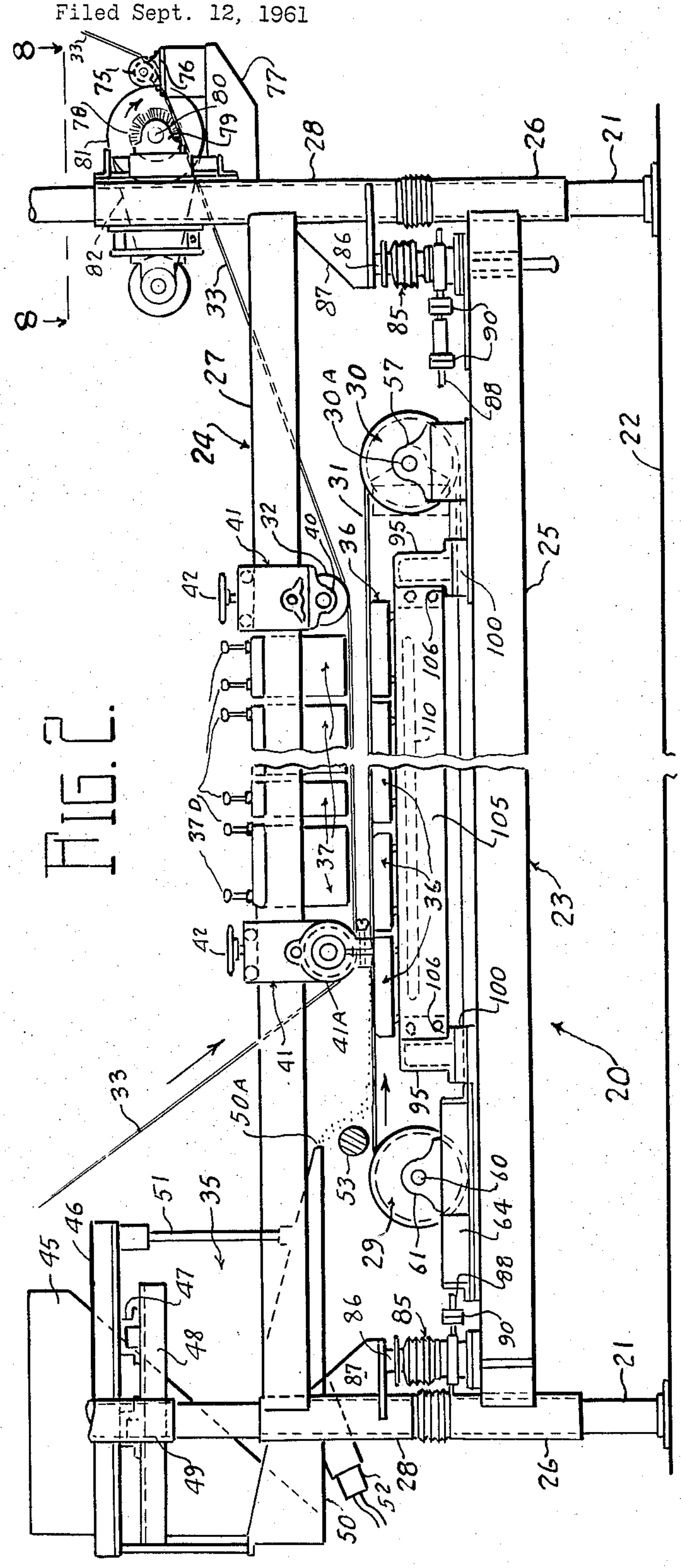
FIG. 2 is a side elevational view of the machine of FIG. 1.
Figure 6:
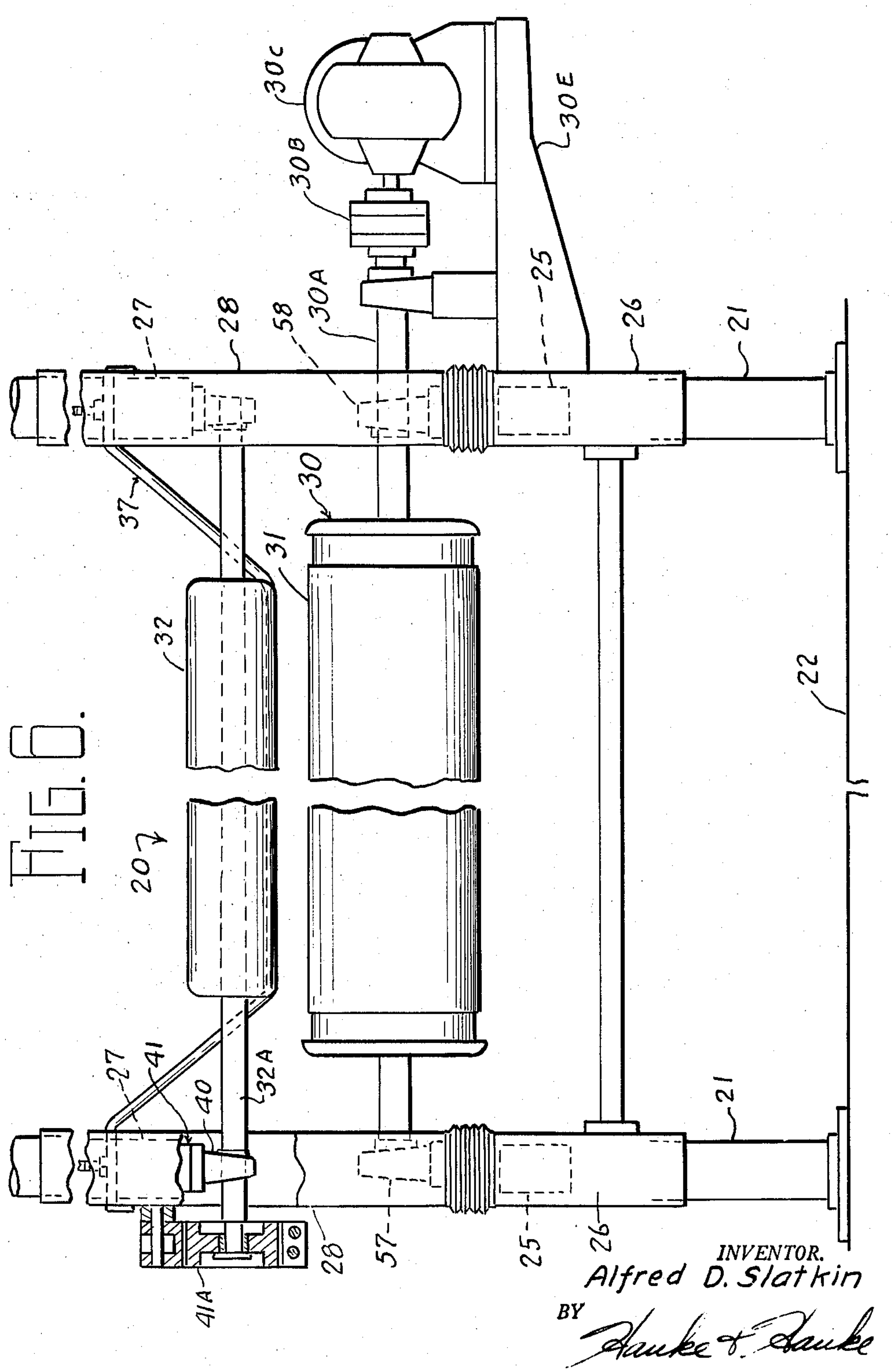
FIG. 6 is an end elevational view of the machine as seen from the right end of FIG. 2.
Figure 7:
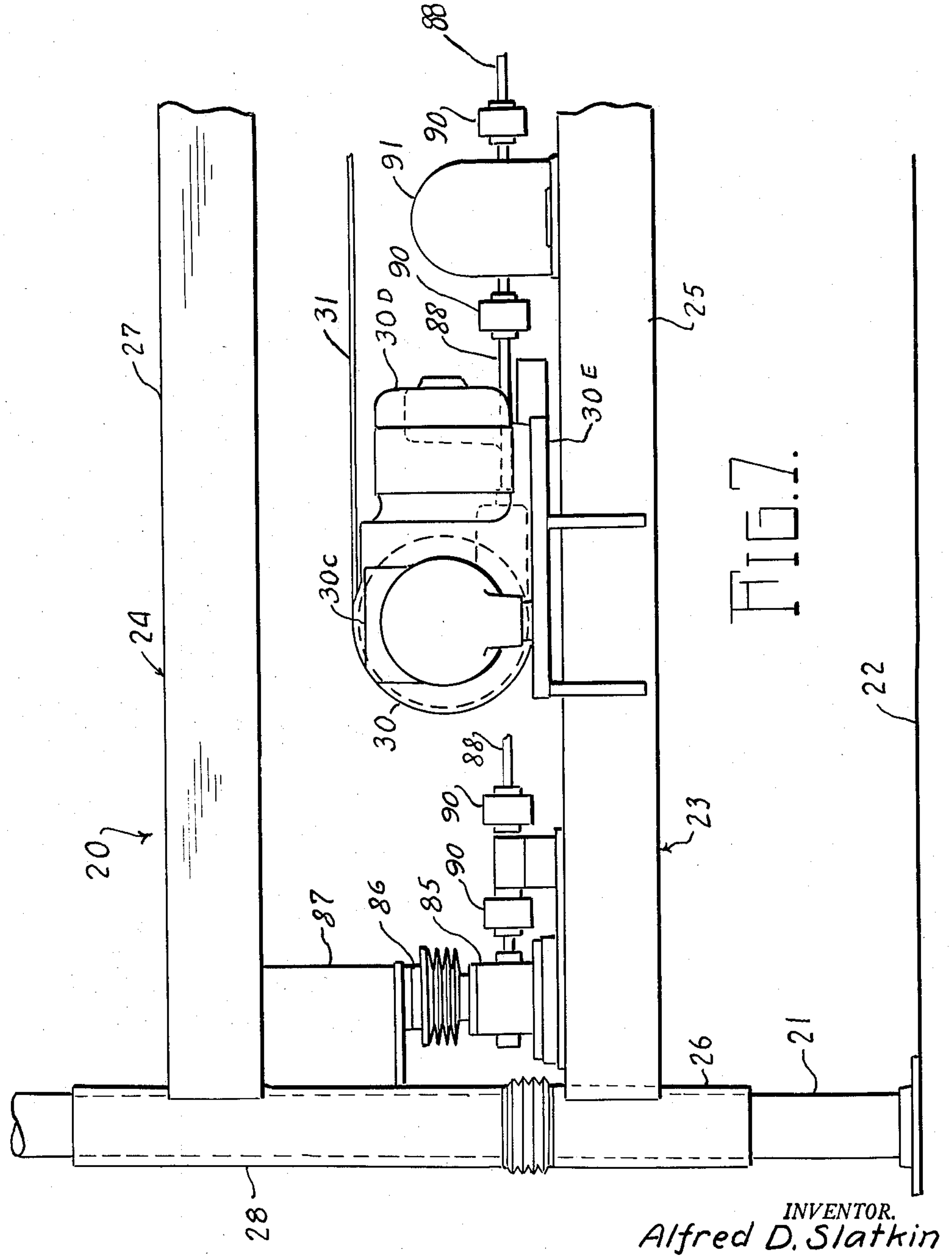
FIG. 7 is a fragmentary side elevational view of the end of the machine as shown in FIG. 6 and as seen from the right side thereof.
Figures 8, 9:
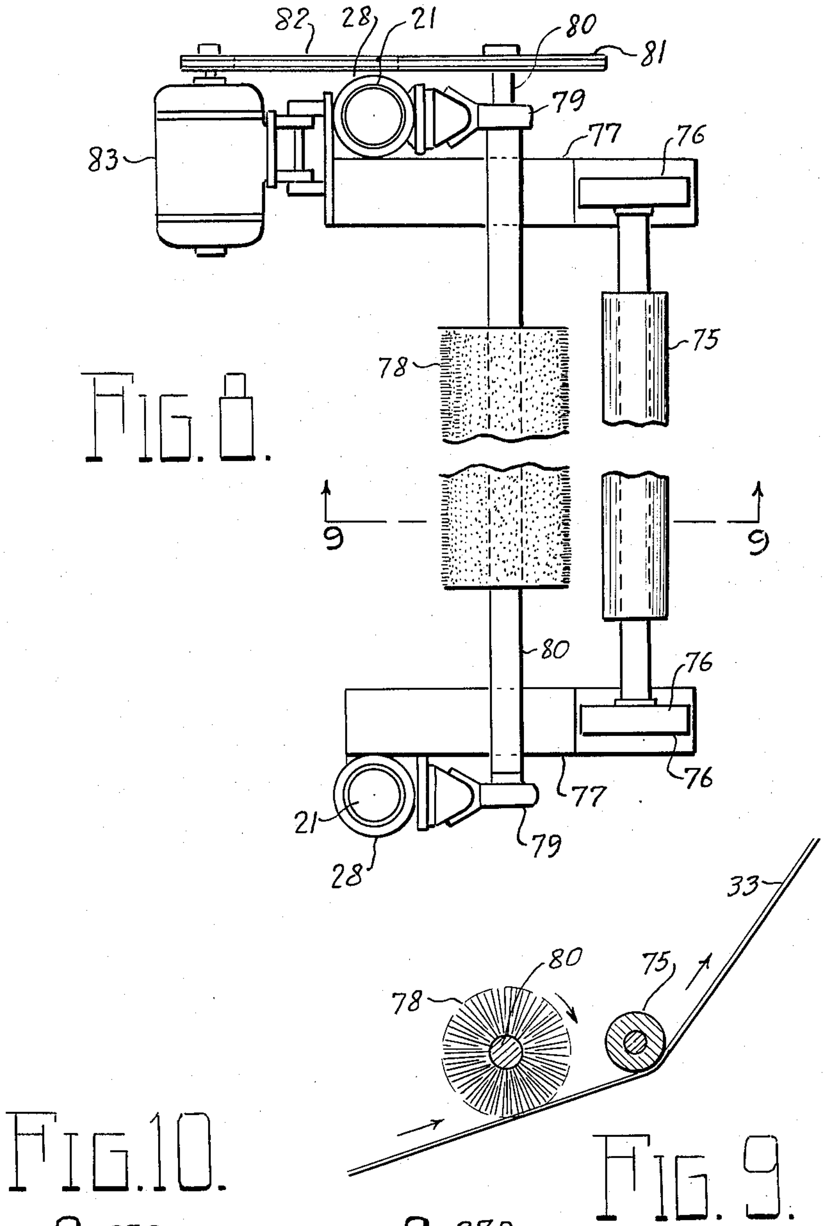
FIG. 8 is a top fragmentary view as seen substantially from the line 8—8 of FIG. 2.
FIG. 9 is a fragmentary cross-sectional view of the machine as taken substantially on the line 9—9 of FIG. 8.

A pair of rollers 29 and 30 are disposed intermediate the frame structures 23 and 24. An endless belt 31 is carried on the rollers, the top web moving from left to right as seen in FIG. 2. The roller 30 is preferably provided with a drive shaft 30A driven through a coupler 30B and gear box 30C from a motor 30D, as shown in FIGS. 6 and 7, the gear box and motor being mounted on a platform 30E carried on one of the frame members 25.

A pair of rollers 32 are carried on the frame structure 24 and are arranged to guide a continuous strip of paper, cloth or the like, indicated by the number 33 and having a layer of glue on its lower surface, in the same direction as and in a parallel plane to the top web of the belt 31.

A grain feeding device 35 is carried on the left support posts 21 as seen in FIG. 2 and is operable to distribute an even layer of grain on the moving top web of the belt 31, and can preferably be adjusted to eliminate an oversupply of grain. The grain is carried by the belt 31 over a set of electron accumulators 36 to ionize the grain and which are constructed to establish an electrostatic field controlled with respect to the grounded assembly to be described. A set of ground plates 37 are supported by the members 27 and have their lower surfaces spaced slightly above the back of the paper or cloth 33. The grain is ionized or loaded with electrons, and rises toward the ground plates 27 due to the forces of the electrostatic field in the air gap between the accumulator 36 and the ground plates 37, thus being deposited on the glue side of the paper or cloth 33.

The paper guide rollers 32 are carried by bearing structures 40 mounted on carriers 41. The carriers 41 are longitudinally adjustable on the frame members 27 and may be secured in any position by turning clamps 42, to locate any desired length of paper or cloth 33 in position parallel to the belt 31, and to locate for the use of more or less of the ground plates 37.

Figure 15:
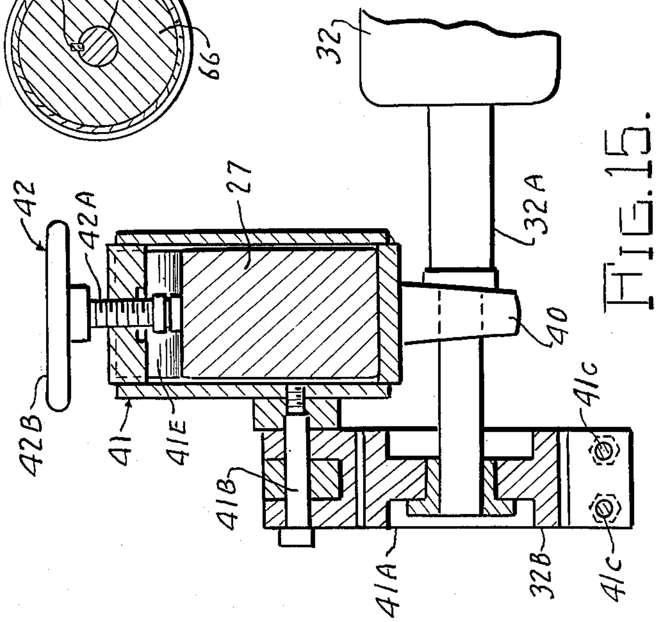
FIG. 15 is a cross-sectional view taken substantially on the line 15—15 of FIG. 14.
Figure 14:
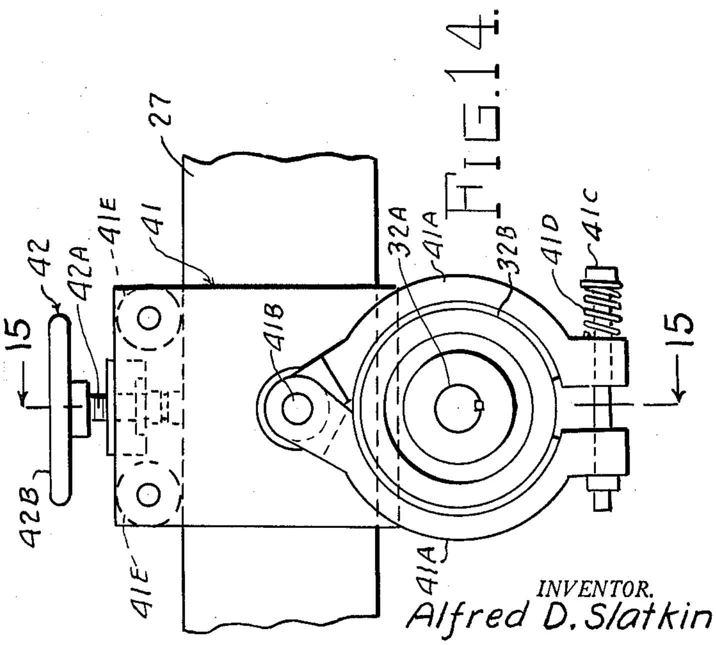
FIG. 14 is a fragmentary enlarged view of mechanism as seen substantially from the line 14—14 of FIG. 5.

FIGS. 14 and 15 illustrate more fully the mechanism of the carriers 41 and clamps 42, particularly those on the side of the machine shown in FIG. 2. Each shaft 32A of the rollers 32 on this side is extended through the bearing structure 40 and carry wheels 32B disposed between two brake shoe members 41A which are suspended on a pivot stud 41B from the carrier 41 and connected by bolts 41C which have springs 41D disposed between the bolt head and one brake shoe member 41A as shown. This arrangement permits the imposition of a load on the rollers 32 which in turn will provide a slight tension on the strip of paper or cloth carried by the rollers 32 to keep it taut and as near to parallel with the grain carrying belt as practicable. The clamp 42 as shown is merely a screw 42A with a hand operated wheel 42B operable for engagement with the top of the frame member 27. When the screw 42A is loosened, the carrier 41 moves readily on rollers 41E mounted over the top of the frame member 27.

Figure 3:
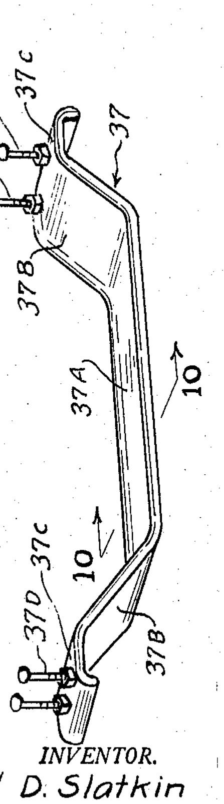
FIG. 3 is a perspective view of a preferred ground plate used in the machine.
Figure 10:
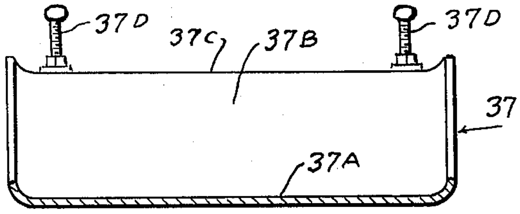
FIG. 10 is a cross-sectional view taken substantially on the line 10—10 of FIG. 3.

Each ground plate 37 is generally U-shaped as seen in FIGS. 3 and 10, having a horizontal flat base 37A and inclined side webs 37B ending in horizontal portions 37C overlying the top of the frame members 27. It will be noted that all edges of the ground plate 37 are rolled upwardly, so that no sharp points or edges are directed toward the accumulators 36 which could cause arcing or which might snag the paper or cloth 33. A pair of thumb screws 37D are provided on the portions 37C for selectively raising and lowering the corners of the ground plate 37 so that the spacing of the base 37A from the back of the cloth or paper 33 may be accurately adjusted. Preferably the base 37A will be as closely spaced as possible without making contact with the cloth or paper 33, but for various purposes the spacing may be changed. Once set for an even grain distribution, further ground plate adjustment will rarely be required.

For different uses of the machine, different ground lengths may be provided by using various combinations of different sized ground plates 37.

Figure 11:
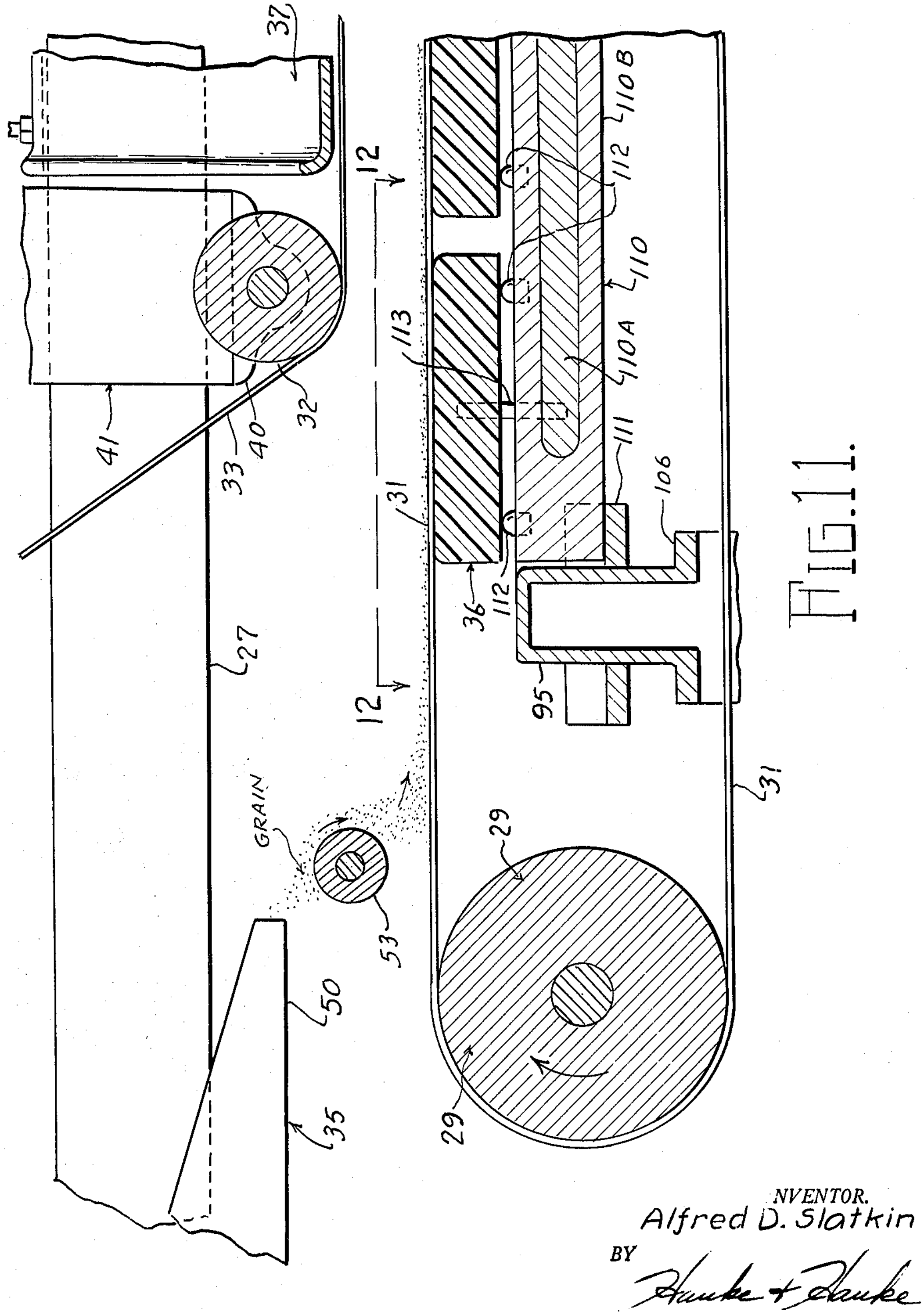
FIG. 11 is an enlarged fragmentary cross-sectional view taken substantially on the line 11—11 of FIG. 5.

The grain feeding device 35 comprises a hopper 45 having side angle members 46 supported on electrically insulating pads 47 which are mounted on angle members 48 secured to sleeves 49 which in turn are carried on the posts 21 as seen in FIG. 2. A feeding tray 50 is suspended from the angle members 46 by rods 51. Grain from the hopper 45 pours into the tray 50 which is preferably of the vibrator-feeding type having an air operated vibrator 52 which operates to move the grain forward to spill in a controlled uniform stream over the edge 50A. A spreading cylinder 53 is disposed in the path of the stream of grain and spins to break up any wave lines otherwise produced by the vibrator 52. The grain is thus spread in a controlled layer on the upper web of the belt 31 which carries it into the electrostatic field as illustrated in FIG. 11.

Both the settings of the grain feeding device 35 and the speed of the belt 31 control the rate of grain entrance into the electrostatic field.

The shaft 30A of the roller 30 is carried at one end by a single bearing support 57 and at the driven end by a pair of spaced bearing supports 58 and 59.

Figure 5:
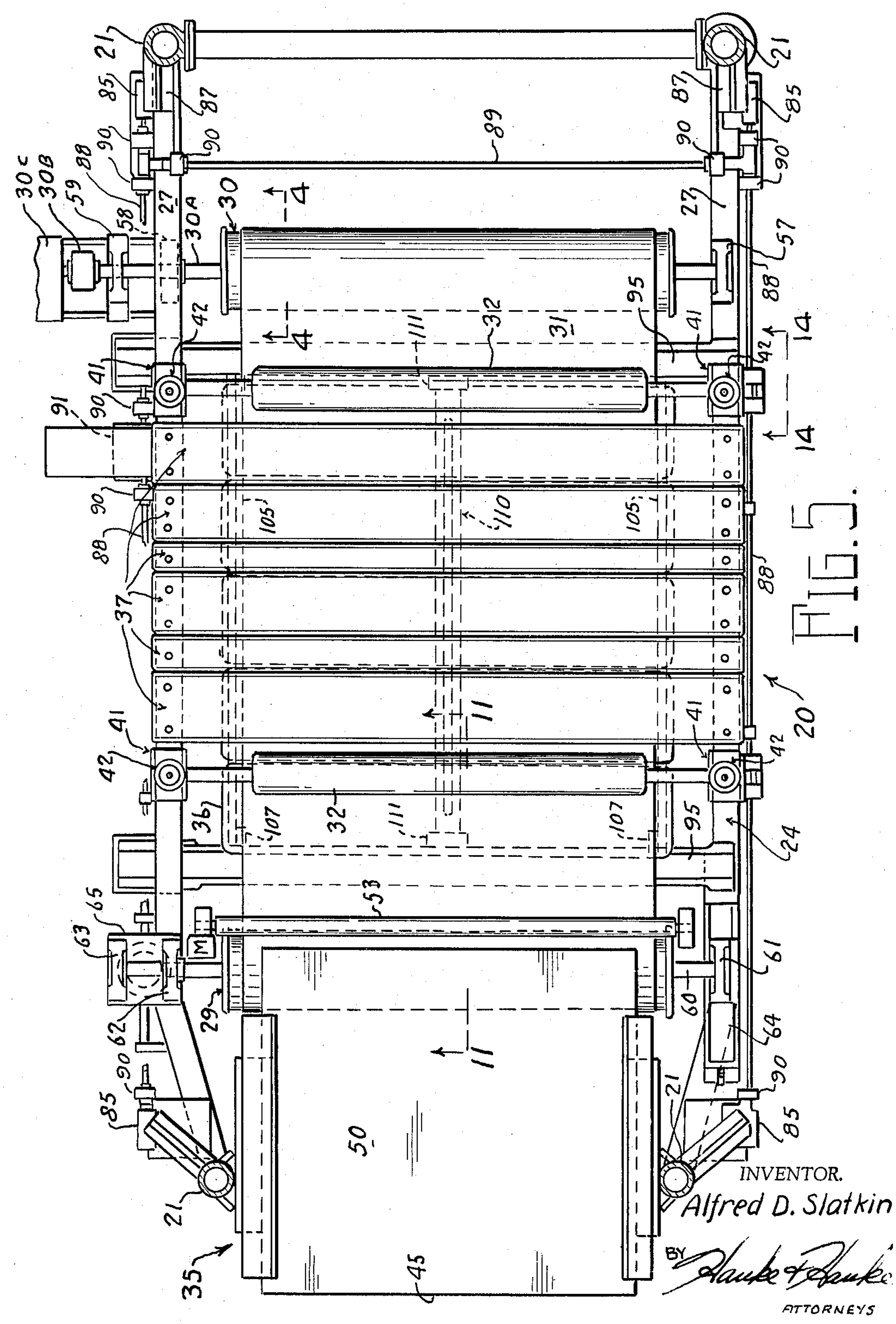
FIG. 5 is a top view of the machine of FIGS. 1 and 2.

The other roller 29 is similarly mounted on a shaft 60 rotatably carried by bearing supports 61, 62 and 63 as shown in FIG. 5. As is noted, the bearing supports 57 and 61 are carried on one of the frame members 25 while the bearing supports 58, 59, 62 and 63, are carried on the other frame member 25. These supports 58, 59, 62 and 63 are of a capacity sufficient to wholly support the rollers 29 and 30 at one side only. The supports 57 and 61 may thus be disconnected from their frame member 25 and pivoted inwardly of the belt plane as indicated at the right side of FIG. 2, whereupon the belt 31 may be readily removed axially with respect to the shafts 30A and 60.

Proper tension and tracking adjustment of the belt 31 is obtainable by the provision of longitudinal adjustment with respect to the frame members 25 of bracket members 64 and 65 on which the bearing supports 61, 62 and 63 are mounted.

Figure 17:
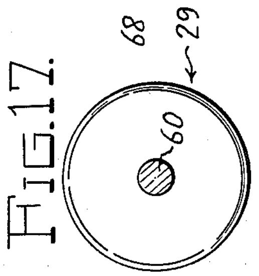
FIG. 17 is an end view of the roller of FIG. 16.
Figure 18:
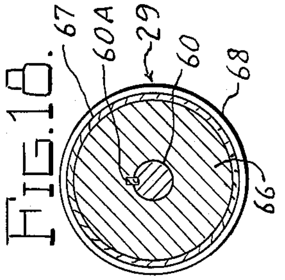
FIG. 18 is a cross-sectional view taken substantially on the line 18—18 of FIG. 16.
Figure 16:
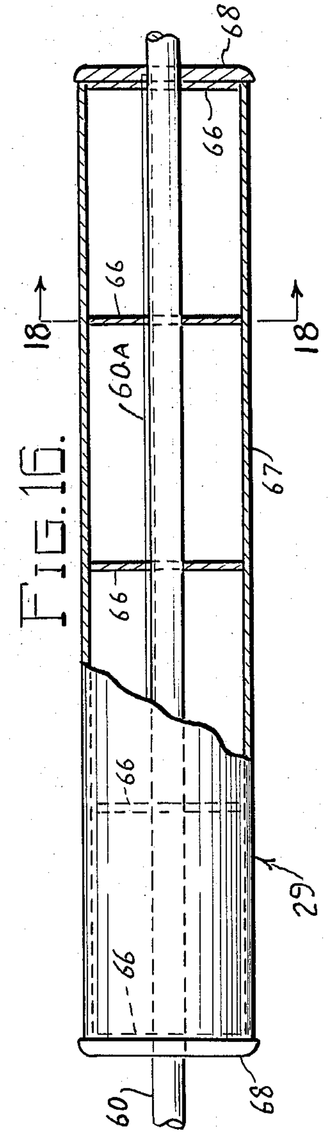
FIG. 16 is a longitudinal cross-sectional view of one of the belt rollers of the machine.

The rollers 29 and 30 are of a special electrically insulating construction, the roller 29 being illustrated in detail in FIGS. 16, 17 and 18. The metal shaft 60 is provided with a longitudinal key 60A for retaining a plurality of spaced supporting discs 66 thereon against rotation. A tubular sleeve 67 is peripherally supported on the discs 66, and the end openings are closed by closure members 68 which are of a diameter slightly larger than the sleeve 67 and are rounded on their outwardly facing peripheral edges.

The discs 66, sleeve 67 and closure members 68 are all formed of a material such as epoxy or the like having high dielectric properties, relatively light weight yet sufficient structural rigidity to support the belt 31.

Figure 4:
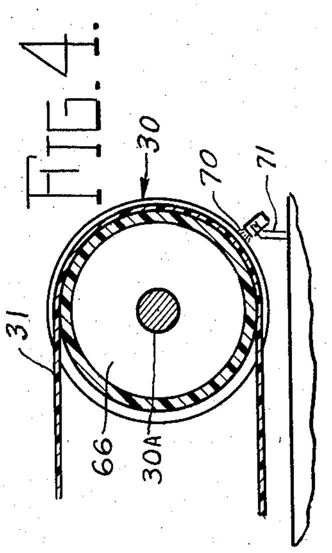
FIG. 4 is a cross-sectional fragmentary view as taken substantially on the line 4—4 of FIG. 5.

The belt 31 is, when the machine is in operation, moving through a dense electrostatic field. It, as well as the grain carried thereby, becomes saturated with electrons, and it is essential that build-up of this charge by repeated passes through the field be prevented, otherwise the electron density cannot be controlled. As seen in FIG. 4, a brush 70 is disposed lengthwise of the roller 30, being mounted in an elongated holder 71 carried preferably by the base of the supports 57 and 58, the brush 70 being in position to contact the belt 31 as shown. This brush serves not only to wipe off the excess charge but also to brush off grain adhering to the belt 31 which would upset control of the grain feeding if carried around by the belt.

It will also be noted, referring to FIGS. 5 and 6, that the ends of the rollers 29 and 30 extend outwardly a considerable distance from the edges of the belt 31. This has a purpose also. The belt of course cannot be thick enough to permit shaping to an anti-corona contour, so there will be a certain discharge of the excess charge from the belt edges. However, the rollers are long enough to capture this charge as the belt moves around them, and the rollers are provided with outwardly facing anti-corona contour to effectively reduce leakage to atmosphere.

As will be seen from considering FIGS. 1, 2, 8 and 9, the paper or cloth 33, after passing under the rollers 32, moves upward under a roller 75 carried in bearing supports 76 mounted by bracket assemblies 77 on the sleeves 28. A brush 78 is rotatably carried by bearing supports 79 also mounted on the sleeves 28, and has an extended shaft 80 provided with a pulley 81 driven by any means such as a belt 82 from a motor 83 also mounted on the sleeve 28. The brush 78 is rotated in the direction indicated in FIGS. 2 and 9 to wipe grain off the back of the paper or cloth 33.

The frame structure 24 and all of the parts carried thereon and/or mounted on the sleeves 28, is selectively raised and lowered with respect to the frame structure 23. For this purpose, jack mechanisms 85 are mounted on the lower frame members 25 and have their pistons 86 connected to arms 87 mounted on the sleeves 28. The jack mechanisms 85 are connected for coordinated movement by longitudinal and lateral drive shafts 88 and 89 interconnected by couplers 90 and driven, as indicated in FIGS. 5 and 7, by a motor 91.

Raising and lowering of the frame structure 24 varies the distance of the ground plates 37 and paper 33 from the accumulators 36 and belt 31, which has a profound effect on the flux density and on the electrostatic forces. Adjustments are made thereby to produce an optimum deposition of grain having wide ranges of grid size.

Figure 12:
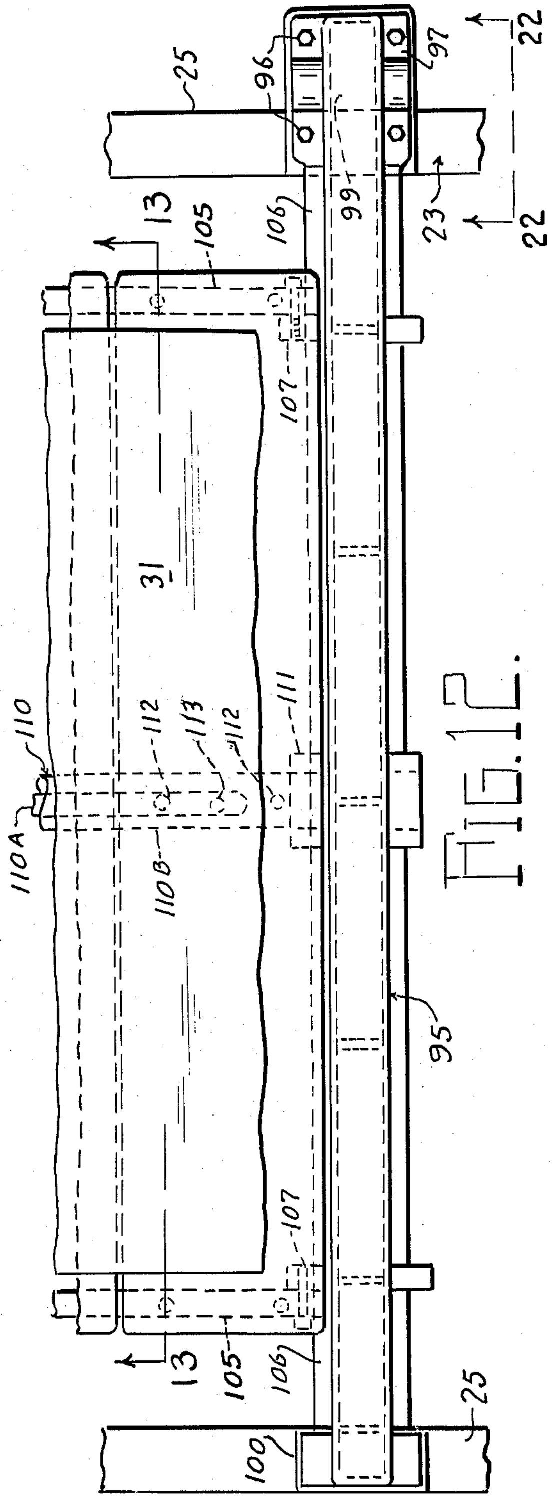
FIG. 12 is a fragmentary view as seen substantially from the line 12—12 of FIG. 11.
Figures 13, 22:
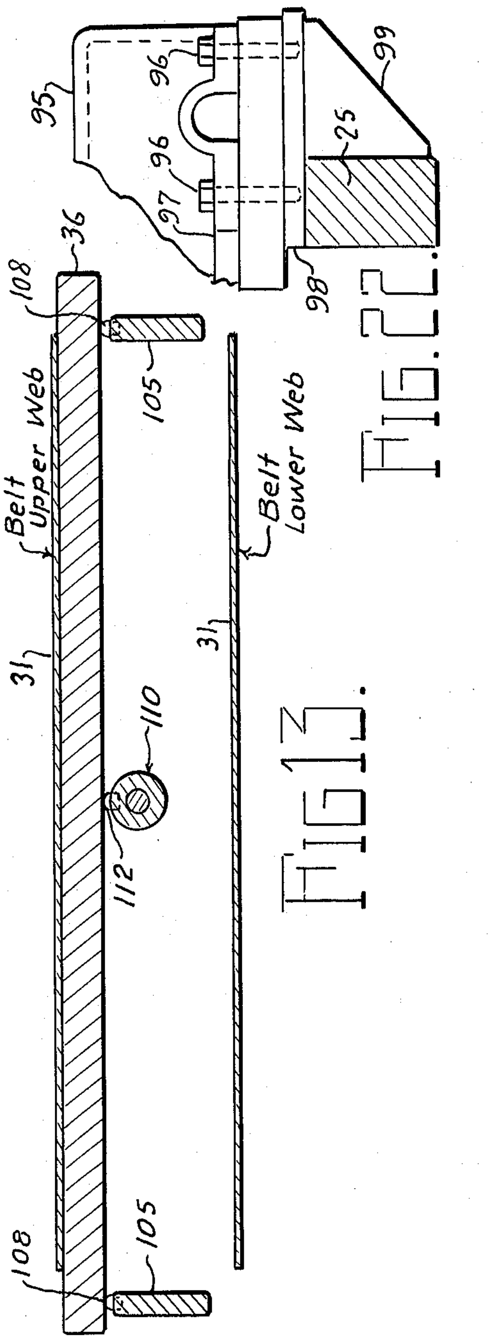
FIG. 13 is a cross sectional view taken substantially on the line 13—13 of FIG. 12.
FIG. 22 is a fragmentary view as seen substantially from the line 22—22 of FIG. 12.

A pair of longitudinally spaced knee structures 95 are carried by the frame structure 23 and extend laterally between the frame members 25, being mounted and secured to one member 25 (the one hidden from view in FIG. 1) as illustrated in FIGS. 12 and 22 by means of studs 96 extending through flanges 97 into a supporting plate structure 98 mounted on the member 25 with a brace 99. The other ends of the structures rest on pads 100 removably mounted on the other frame member 25 (the one seen in FIG. 1).

It will be seen that the knees 95 are thereby disposed in the space between the upper and the lower webs of the belt 31. However, their entire weight can be carried by the frame member 25 shown in FIG. 22 so that removal of the pads 100 from the other member 25 provides a space through which the lower web of the belt 31 can pass on its removal from the machine.

The belt 31 is a component which is highly susceptible to damage and wear, and it is apparent that the present construction, with the knees 95 and the rollers 29 and 30 being supportable on one side of the frame structure 23, provides a means for readily replacing the belt without disassembly of a great many machine parts.

A pair of laterally spaced support members 105 extend between the knees 95 as shown in FIGS. 1, 2, 5, 12 and 13, resting on flanges 106 and secured to bosses 107.

The electron accumulators 36 are then supported on these members 105, preferably resting on rounded pads 108 as shown in FIG. 13. The accumulators are thus easily removed from the machine for repair and/or replacement. The knees 95 and support members 105 are made of a high dielectric material such as epoxy and incorporate the anti-corona design to be described further on.

Figure 20:
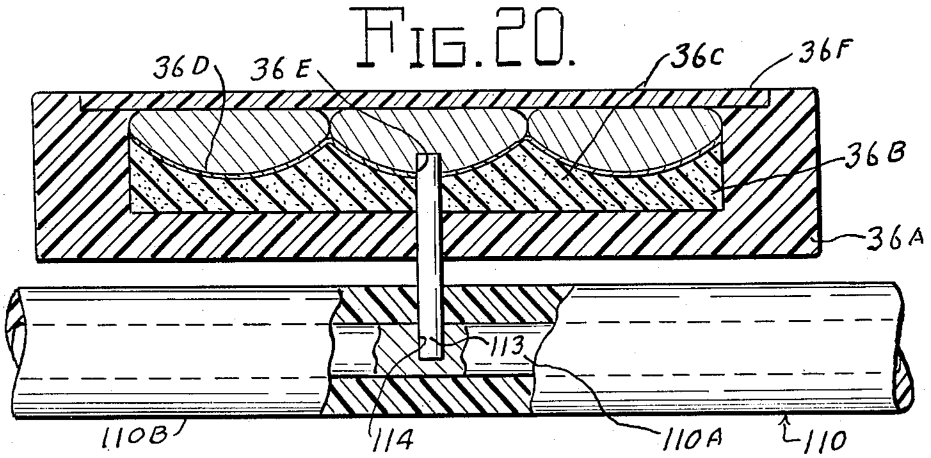
FIG. 20 is a cross-sectional view taken substantially on the line 20—20 of FIG. 19.
Figure 19:
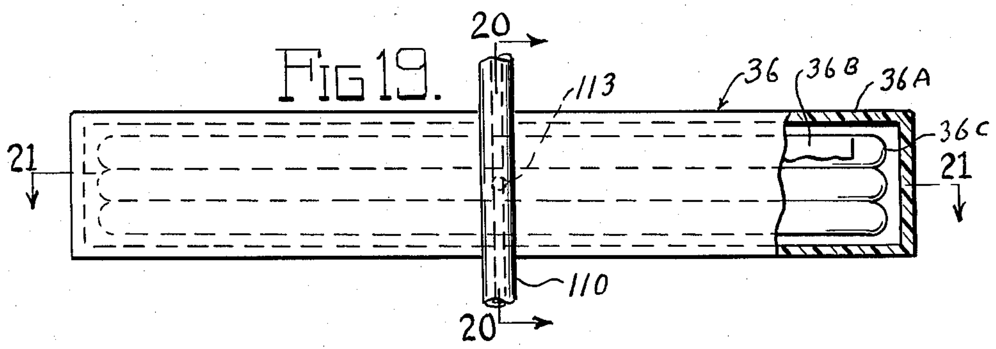
FIG. 19 is a bottom view, partially in section, of the electron accumulator and bus bar embodying the invention.
Figure 21:
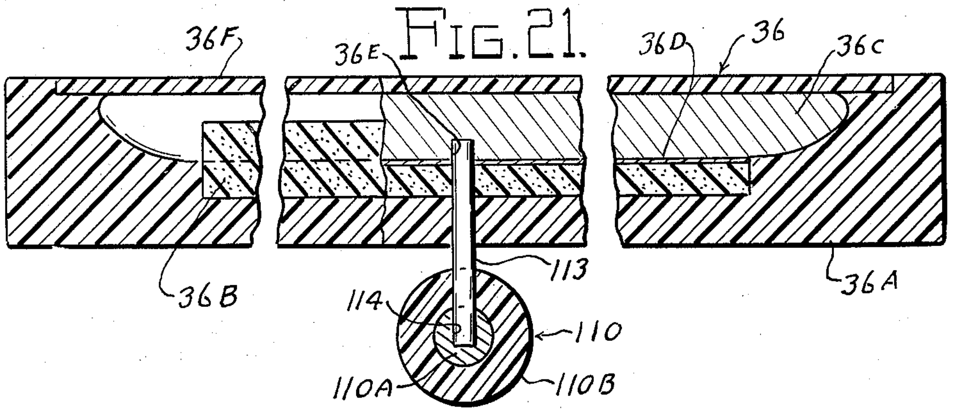
FIG. 21 is a cross-sectional view taken substantially on the line 21—21 of FIG. 19.

A bus bar assembly 110 is cradled at its ends in semicircular supporting bosses 111 extending from the center of the knees 95 as indicated in FIGS. 5, 11 and 12 and extends beneath the accumulators 36 which are spaced from the bus bar assembly 110 by pads 112. The construction of the capacitors 36 and bus bar assembly 110 is illustrated in more detail in FIGS. 19, 20, and 21 as follows:

The bus bar assembly 110 comprises an inner conductor 110A having smoothly rounded ends and sheathed in a high dielectric insulator 110B. Conducting terminals 113, one for each accumulator positioned and preferably made of aluminum, are each recessed into a bore 114 as shown and extend upward for connection into the accumulators. A power cable 110C connects the bus bar conductor 110A with the power source (not shown).

The electron accumulators 36 each comprises a shell 36A of high dielectric material such as epoxy with an interior section 36B of light weight electron absorbing material such as styrofoam. Several electrodes 36C, preferably of high conductance and high capacitance such as aluminum, are supported by the section 36B and are electrically connected by touching at their side edges and through the use of a layer of aluminum foil 36D. The terminal 113 is connected to one of the electrodes 36C which is provided with a recess 36E for the purpose. The lower sides of the electrodes 36C are uniformly convex throughout as shown while the top surfaces are flat, with the edges radiused uniformly. The electrodes 36C are also highly polished.

Completing the assembly of the accumulator 36 is a sheet 36F of phenolic or the like having preselected dielectric strength and arc resistance of close tolerance thickness disposed on top of the electrodes 36C.

It will be seen that one or more accumulators 36 may be used. With missing accumulators, the corresponding terminals 113 having been removed from the bus bar assembly, the holes therein are plugged with a high dielectric material.

The construction of the accumulators is such as to produce a controlled electron charge at the upper surface while leakage from the sides and bottoms is effectively suppressed due to the radiused and highly polished surfaces. This charge is at a controlled voltage, and the electron flow to the ground plates, if from a bare electrode, would be so fast that it would have no opportunity to carry the grain. Thus the dielectric sheet 36F operates to slow down the electron speed, such that the voltage is reduced and the flux density is increased. Under carefully controlled conditions, and with a carefully calculated dielectric sheet 36F, a flux density is produced which can provide for optimum ionization. The grain is then able to be carried electrostatically toward the ground plates.

It will be noted that different grain types are of different specific gravity, so the amount deposited would vary under uniform applying conditions. Control of deposit is achieved electrostatically by applying the requisite degree of power and mechanically by proper feeding.

In the machine as constructed for actual practice, the ¾ kilowatt D.C. generator provides all the power needed for all practical purposes. The belt 31 is of a known dielectric having a total dielectric strength of about 15 kv. The phenolic sheet 36F covering the electrode elements 36C is about 400 v./mil, and together the belt and phenolic sheet produce a reduction in electron speed plus an increased flux density. The ground plates 37 may then be spaced from the accumulators a distance sufficient to give maximum electrostatic field efficiency with complete lack of arcing tendency.

For abrasive grain of grid sizes 50 or coarser, I use a phenolic sheet ⅝ inch thick having a dielectric strength of 400 v./mil. For smaller grain, I use a sheet ½ inch thick having a dielectric strength of 400 v./mil. I have found that the secret of success in this process is to first of all assure full ionization of the grain. If this is achieved, moving of the grain requires very little electrostatic force.

Another essential is that all of the power goes to the field and not to ionizing the surrounding air. Thus, the electrical elements and all components within ten inches thereof, except for the top surfaces of the electrode elements themselves, are provided with an anti-corona design in which all corners and edges have a minimum ¾ inch radius and as much more as possible. In fact, I have found that a rule of thumb approach in electrostatic machines is to provide no less than a ¾ inch radius for each 100 kv. used. Thus, the knees 95, support members 105, rollers 29, 30 and 32, bus bar and other adjacent structure are so designed. Members which could leak off power, such as the rollers 29 and 30, knees 95 and members 105, are made of high dielectric material. In addition, the supporting structure of the entire machine is electrically bound together with copper flexibles (not shown) and is suitably grounded so no charge buildup will occur.

The electrodes 36B have, as before mentioned, large radius lower surfaces and flat top surfaces, and the edges have a ⅜ inch radius so that the electrons are permitted to leak off outwardly a certain degree but not beyond the lateral limits of the accumulator housing.

Although I have described only one preferred embodiment of my invention, it will be apparent to one skilled in the art that various changes and modifications may be made therein without departing from the spirit of the invention or the scope of the appended claims.

I claim:

1. In an electrostatic processing machine comprising an electrical power source, an electrostatic field control means including an air gap, and means moving material to be processed through said air gap, said control means comprising an electron accumulator on one side of said gap and having an electrode connected with the negative of said power source, a grounded element on the other side of said gap, and said accumulator having a dielectric element disposed intermediate said electrode and said gap and operable to reduce the speed of electrons discharged from the accumulator through the gap to said grounded element, said electrode having a shape operable to concentrate and produce even distribution of electrons on that side facing the air gap between said accumulator and said grounded element.

2. In the machine as defined in claim 1 and in which said electrode has a substantially planar surface facing said air gap and in which all other surfaces of said electrode are convexly contoured.

3. In the machine as defined in claim 2 and in which all surfaces of said electrode are highly polished.

4. In the machine as defined in claim 2 and in which said grounded element comprises a plate having a substantially planar surface facing said air gap and convexly contoured edges peripherally of said planar surface.

5. In the machine as defined in claim 4 and in which the planar surfaces of said electrode and said plate are disposed in substantially parallel planes, and having means selectively adjusting the distance between said planar surfaces during operation of said machine.

6. In the machine as defined in claim 4 and including means selectively adjusting the slope of said plate and electrode planar surfaces with respect to each other.

7. In the machine as defined in claim 4 and in which said convexly contoured edges of said plate are curved away from said air gap on the entire periphery of said planar surface.

8. In the machine as defined in claim 1 and in which said electrode comprises an elongated bar extending transversely of the direction of material movement, said bar having a substantially planar surface facing said air gap, and the surfaces facing away from said gap being convexly contoured throughout.

9. In an electrostatic processing machine comprising an electrical power source, an electrostatic field control means including an air gap, and means moving material to be processed through said gap, said control means comprising an electron accumulator assembly on one side of said gap and a grounded element on the other side of said gap, said accumulator assembly comprising an elongated conductor bar extending transversely of the direction of material movement, said bar having a substantially planar surface facing said gap, and a flat sheet of material of predetermined thickness and predetermined dielectric strength lying on said planar surface and of a greater area than said planar surface, such as will effectively reduce the speed of the electrons and produce a high uniform flux density over the entire surface facing said gap, and all other surfaces of said bar being convexly curved throughout.

10. In the machine as defined in claim 9 and in which the remaining surface of said bar is highly polished.

11. An electron accumulator for an electrostatic processing machine, comprising an elongated bar electrode having a substantially planar surface disposed in a plane parallel to the axis of said bar, and the remaining surface of said bar including the ends and sides thereof being smoothly convexly curved throughout.

12. The electron accumulator as defined in claim 11 and having a cylindrical terminal pin extending outwardly of the bar and oppositely from the planar surface.

13. An electron accumulator assembly for electrostatic processing machines, comprising an elongated electrode bar having a substantially planar surface disposed in a plane parallel to the axis of said bar, the remaining surface of said bar including the ends and sides thereof being smoothly convexly curved throughout, and a flat sheet of material of predetermined thickness and selected dielectric strength lying on the planar surface of said bar.

14. The accumulator assembly as defined in claim 13 and in which the peripheral edge of said dielectric sheet is disposed laterally and longitudinally outwardly of the peripheral edge of said planar surface a distance sufficient to encompass substantially the full area over which electrons may be discharged from the planar surface upon charging said bar with high voltage.

15. An electron accumulator assembly for electrostatic processing machine comprising a plurality of elongated electrode bars disposed on parallel axes, said bars each having a planar surface, said planar surfaces being disposed in a common plane parallel to said axes, the remaining surfaces of said bars including the ends and sides thereof being smoothly convexly curved throughout, and a flat sheet of material of predetermined thickness and selected dielectric strength lying on the planar surfaces of said bars, means electrically connecting said bars, and one of said bars having a terminal adapted for connection to a power source.

16. The accumulator assembly as defined in claim 15 and in which each of said bars is in physical contact with adjacent bars.

17. The accumulator assembly as defined in claim 15 and having a sheet of conducting foil disposed in contact with the curved surfaces of said bars.

18. In an electrostatic processing machine comprising a selectively variable electrical power source, an electrostatic field control means including a grounded plate, an electron accumulator connected with said power source and spaced from the grounded plate, said accumulator having an electrode provided with a surface facing said plate and a dielectric element of selected dielectric strength disposed adjacent said electrode on said surface facing said plate, said plate and accumulator being spaced to provide an air gap, means selectively adjusting said plate with respect to said accumulator and operable during operation of said machine to vary the distance between said plate and said accumulator, whereby to produce a slowly rising controlled electrostatic flux field, means moving a material to be processed through said air gap near said accumulator, means selectively varying the volume of said material moved into said air gap and the speed of movement therein whereby to provide for substantially uniform ionization of said material to permit the electrostatic field to effect movement of said material toward said grounded plate in volume relative to degree of power, spacing of accumulator and plate, speed of movement through the gap, and dimensions of said field, said electrode having a shape operable to concentrate and produce even distribution of electrons on that side facing the air gap between said accumulator and said grounded plate.

19. In the machine as defined in claim 18 and including means moving a sheet of material through said air gap near said grounded plate to operate as a depository for the material moving toward said grounded plate, and means selectively adjusting the distance of said grounded plate from said sheet of material.

20. In an electrostatic processing machine comprising a stationary supporting structure, a first and a second frame structure carried by said supporting structure, a pair of parallel spaced rollers rotatably carried by said first frame structure, an endless belt carried on said rollers, a knee structure supported on said first frame structure and extending into the space provided intermediate said rollers and intermediate parallel portions of said belt, an electron accumulator assembly carried by said knee structure and disposed adjacent the inner side of one portion of said belt, a grounded plate carried by said second frame structure and disposed at a controlled distance from said one portion of said belt on the opposite side thereof and from said accumulator assembly, said accumulator assembly having an electrode and a dielectric element disposed intermediate said electrode and said one portion of said belt and closely adjacent thereto said electrode having a shape operable to concentrate and produce even distribution of electrons on that side facing the air space between said accumulator assembly and said ground plate.

21. In the machine as defined in claim 20 and in which each of said rollers comprises a shaft rotatably carried at the ends by said first frame structure, a plurality of longitudinally spaced discs secured on said shaft and disposed in planes normal to the axis thereof, and a cylinder of electrically insulating synthetic plastic material carried peripherally on said discs and concentric with the shaft axis.

22. In the machine as defined in claim 21 and including end plates of electrically insulating material carried on said shaft and closing the ends of said cylinder, the peripheral rims of said plates having convexly curved edges on the sides facing axially outwardly of the cylinder.

23. In the machine as defined in claim 20 and including grounded means adjacent the outer surface of said belt and exteriorly of the flux field produced intermediate said accumulator assembly and said grounded plate and operable to discharge excess electron charges from said belt after moving out of said field whereby to prevent accumulation of charge on said belt from altering the density of said flux field.

24. In the machine as defined in claim 23 and in which said grounded means comprises an elongated brush extending transversely of said belt and operable in addition to discharging excess charges to brush excess unprocessed material from said belt.

25. In the machine as defined in claim 20 and in which said first frame structure comprises a pair of spaced longitudinal frame members disposed on opposite sides of said belt and parallel to the direction of movement thereof, said knee structure comprising a pair of spaced support members extending normal to the frame members and parallel to the belt movement and the rollers, means mounting said rollers and said support members on one of said frame members and capable of supporting the full weight of the rollers and said support members thereon, and means supportably connecting said rollers and said support members to the other frame member, said last mentioned support members being selectively disconnected from said other frame member, whereby said last mentioned support members may be disconnected from said other frame member and rotated with respect to said rollers to permit said belt to be removed axially from the rollers without necessitating removal of said knee structure and accumulator assembly.

26. In the machine as defined in claim 20 and in which all edges of said knee structure are convexly curved.

27. In the machine as defined in claim 20 and including a bus bar assembly carried by said knee structure and disposed adjacent said accumulator assembly element on the opposite side thereof from said belt portion, said bus bar assembly comprising an inner conducting core and an insulating sleeve enclosing said core, and a conducting connector pin extending from said accumulator structure through said insulating sleeve to said core.

28. In the machine as defined in claim 1 and including a bus bar assembly disposed adjacent said accumulator on the opposite side thereof from said air gap, said bus bar assembly comprising an inner cylindrical conducting core and a cylindrical insulating sleeve enclosing said core, and a conducting connector pin extending from said accumulator through said insulating sleeve to said core, and said bus bar core having convexly rounded ends.

29. An electron accumulator for an electrostatic processing machine, comprising an electrode member having a planar surface and the remaining surfaces being smoothly convexly curved throughout, and a dielectric member covering at least said planar surface.

30. The electron accumulator as defined in claim 11 and in which the surfaces of said bar are highly polished.

31. In an electrostatic processing machine, comprising an electrical power source, an electrostatic field control means including an air gap, and means moving material to be processed through said gap, said control means comprising an electron accumulator assembly on one side of said gap and a grounded element on the other side of said gap, said accumulator assembly comprising an elongated conductor bar extending transversely of the direction of material movement and said bar having a substantially planar surface facing said gap, and a flat sheet of material of predetermined thickness and predetermined dielectric strength lying on said planar surface and of a greater area than said planar surface, said accumulator assembly having a casing of material having greater dielectric strength than said dielectric sheet, said casing closely surrounding said electrode and the dielectric sheet with the face of said sheet opposite to the face lying on the bar being exposed to said air gap, said electrode having a shape operable to concentrate and produce even distribution of electrons on that side facing the air gap between said accumulator and said grounded element.

32. In an electrostatic processing machine, comprising an electrical power source, an electrostatic field control means including an air gap, and means moving material to be processed through said gap, said control means comprising an electron accumulator assembly on one side of said gap and a grounded element on the other side of said gap, said accumulator assembly comprising an elongated conductor bar extending transversely of the direction of material movement and said bar having a substantially planar surface facing said gap, and a flat sheet of material of predetermined thickness and predetermined dielectric strength lying on said planar surface and of a greater area than said planar surface, said accumulator assembly having a casing of material having greater dielectric strength than said dielectric sheet, said casing closely surrounding said electrode and the dielectric sheet with the face of said sheet opposite to the face lying on the bar being exposed to said air gap, a conducting connector pin connected with the surface of said bar opposite said planar surface and extending through the casing in a direction substantially opposite to the air gap.

33. In an electrostatic processing machine comprising an electrical power source, an electrostatic field control means including an air gap, and means moving material to be processed through said air gap, said control means comprising an electron accumulator on one side of said gap and having an electrode connected with the negative of said power source, a grounded element on the other side of said gap, and said accumulator having a dielectric element disposed intermediate said electrode and said gap and operable to reduce the speed of electrons discharged from the accumulator through the gap to said grounded element, said electrode having a shape operable to concentrate and produce even distribution of electrons on that side facing the air gap between said accumulator and said grounded element, and means selectively varying the distance of said grounded plate from said accumulator while said material is being processed.

34. An electron accumulator for an electrostatic processing machine, comprising an electrode member having a non-convex surface and the remaining surfaces being smoothly convexly curved throughout, and a dielectric member covering at least said non-convex surface.

References Cited by the Examiner

UNITED STATES PATENTS

| | | | |
|---|---|---|---|
| 2,223,476 | 12/1940 | Amstuz. | |
| 2,328,577 | 9/1943 | Oglesby. | |
| 2,333,213 | 11/1943 | Slayter | 317—2 |
| 2,385,873 | 10/1945 | Melton | 317—3 |
| 2,457,256 | 12/1948 | Melton | 317—3 |
| 2,470,889 | 5/1949 | Drescher | 198—41 |
| 2,650,565 | 9/1953 | Spooner | 317—3 X |
| 2,869,511 | 1/1959 | Dickey et al. | 317—2 X |
| 3,016,904 | 1/1962 | Schmerund | 198—41 X |

FOREIGN PATENTS

| | | |
|---|---|---|
| 164,407 | 7/1955 | Australia. |

SAMUEL BERNSTEIN, *Primary Examiner.*

D. YUSKO, *Assistant Examiner.*